United States Patent
Dysarz

Patent Number: 5,120,016
Date of Patent: Jun. 9, 1992

[54] SUN DECK AND PIER ROD AND TOOL HOLDING DEVICE

[76] Inventor: Edward Dysarz, 11423 Tiola La., Houston, Tex. 77072

[21] Appl. No.: 567,119

[22] Filed: Aug. 13, 1990

[51] Int. Cl.⁵ .............................................. A01K 97/10
[52] U.S. Cl. ................ 248/539; 248/222.3; 248/222.1; 43/21.2
[58] Field of Search ........... 248/222.3, 539, 514, 248/534, 297.2, 222.1, 222.4, 223.1, 519; 43/21.2

[56] References Cited

U.S. PATENT DOCUMENTS

| | | | |
|---|---|---|---|
| 988,743 | 4/1911 | Stillwaggon | 248/225.1 X |
| 2,859,710 | 11/1958 | Elsner | 248/222.3 X |
| 2,940,558 | 6/1960 | Schlueter | 248/222.3 X |
| 2,954,909 | 10/1960 | Miller et al. | 248/514 X |
| 3,313,509 | 4/1967 | Lockert | 248/222.3 X |
| 3,902,269 | 9/1975 | Dunlap | 248/534 X |
| 4,410,157 | 10/1983 | Monti et al. | 248/297.2 X |
| 4,527,349 | 7/1985 | Emory, Jr. | 248/534 X |
| 4,582,287 | 4/1986 | Dekeorg | 248/539 X |
| 4,637,156 | 1/1987 | Simmons | 248/514 X |
| 4,830,203 | 5/1989 | Ennis | 248/225.1 X |

Primary Examiner—Alvin C. Chin-Shue
Attorney, Agent, or Firm—Derek R. Van Gilder

[57] ABSTRACT

A device that can be fixed to a sun deck or the deck of a dock or pier by means of a T bar extending through the spaces between the floor boards or planks of a sun deck or a dock or a pier wherein said T bar is inserted into the space and rotated ninety degrees to where the T bar catches the board or planks. A threaded plug is fixed to the shaft of the T Bar to prevent the T bar from falling out of the space between the floor boards. A T flange with an inside thread is screwed onto the threaded plug, pulling the T flange onto the bottom side of the planks, locking the T flange and T bar to the planks. A fishing rod or other item is placed into the vertical tube of the T flange and is held by gravity or other means. This sun deck or dock and pier rod and tool holding device can be used to support a chair or work tools. It can be removed in the same manner that it was set.

8 Claims, 5 Drawing Sheets

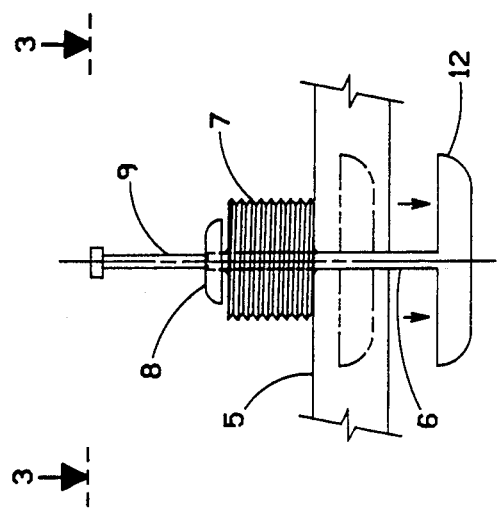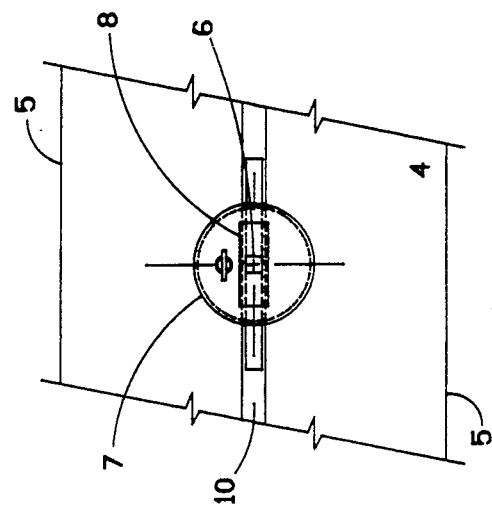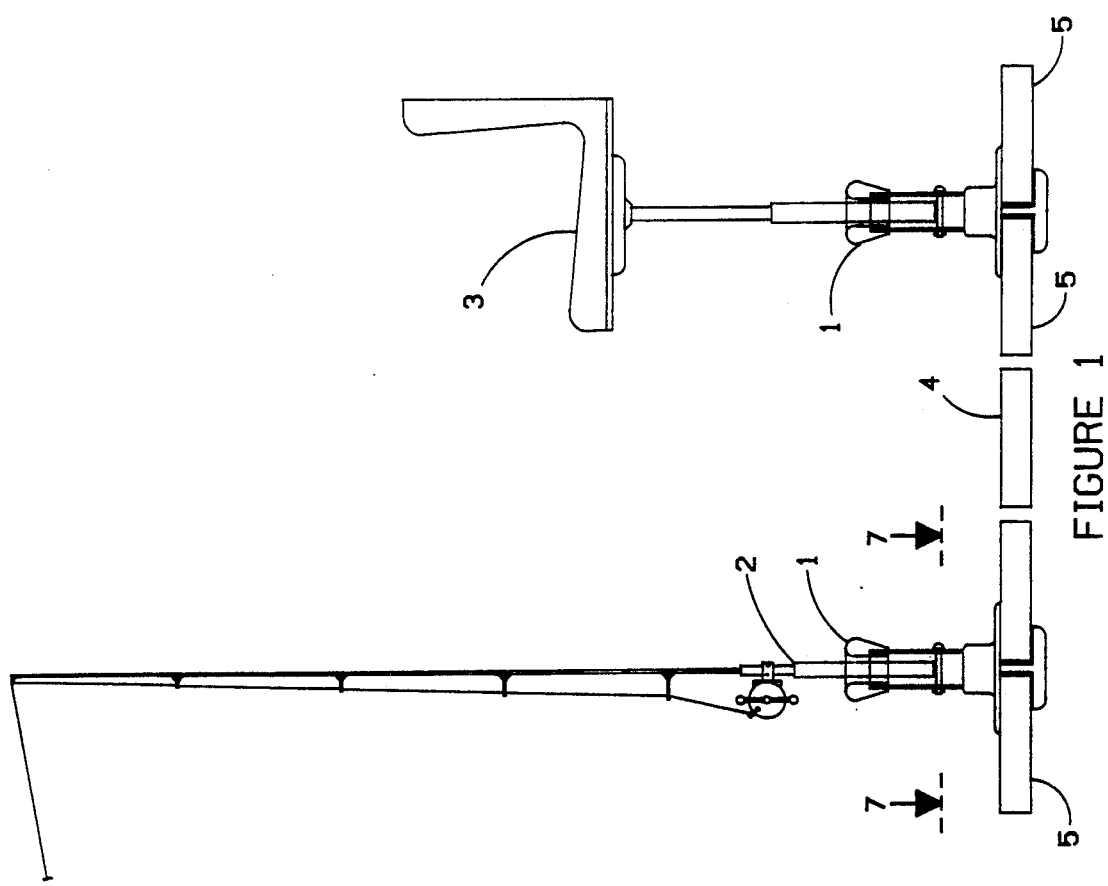

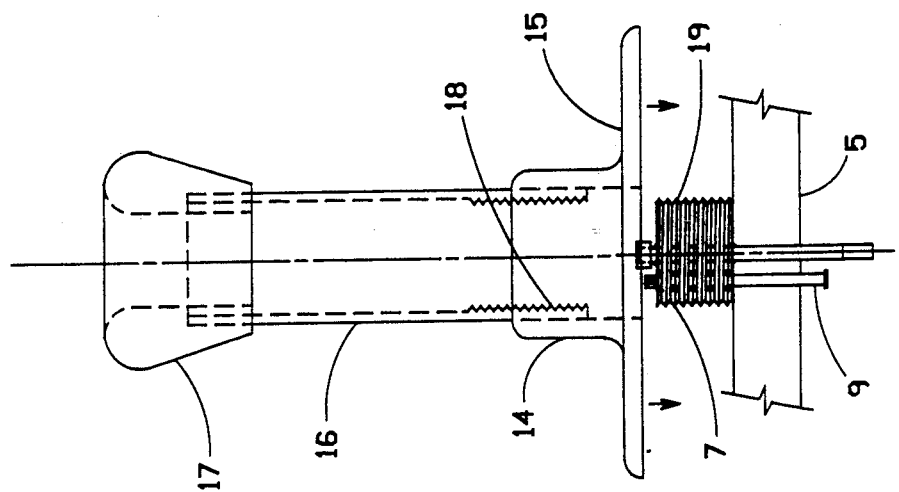
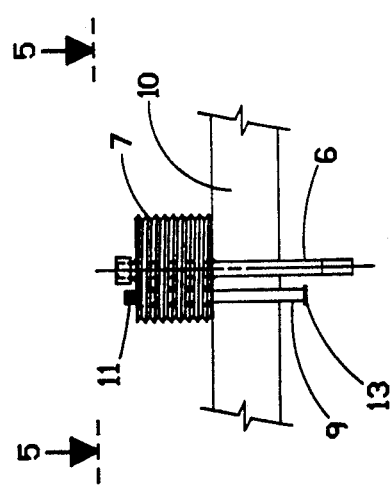
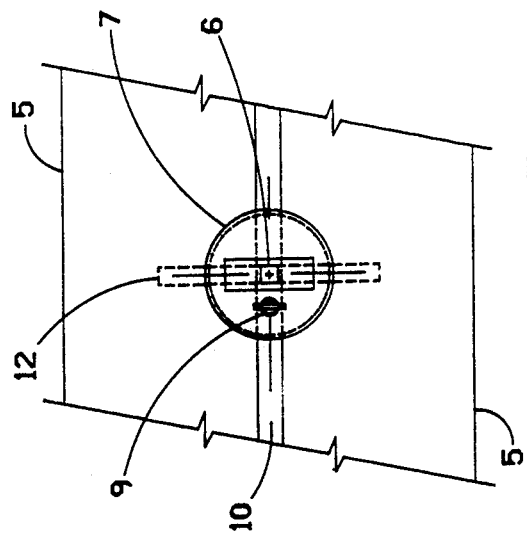

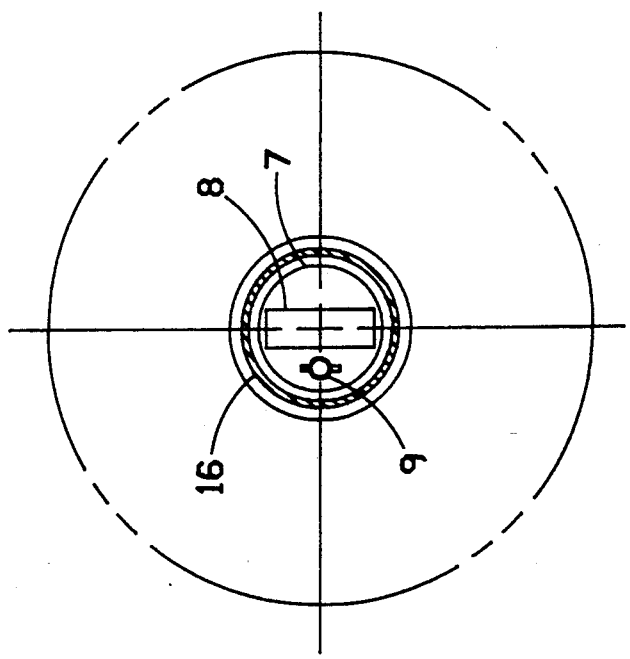
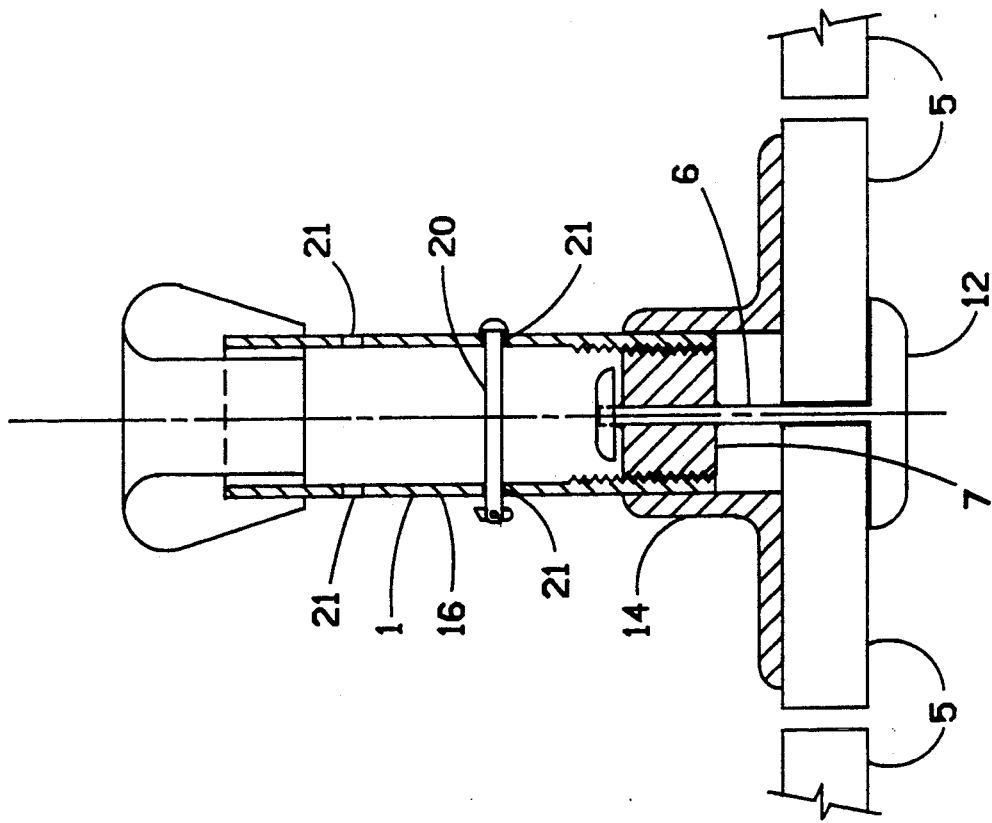
FIGURE 10
FIGURE 9

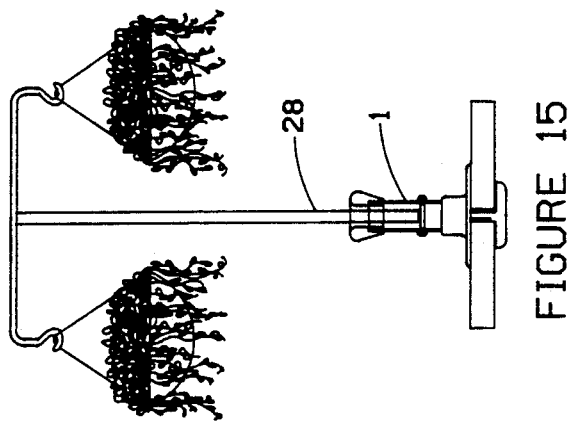
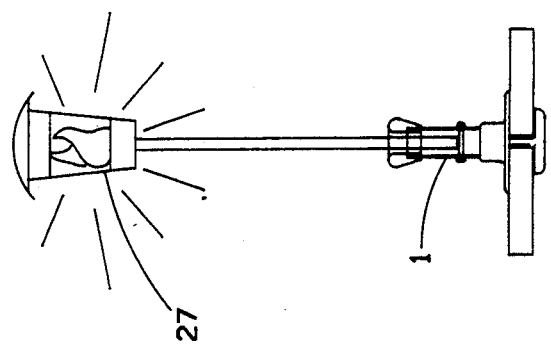
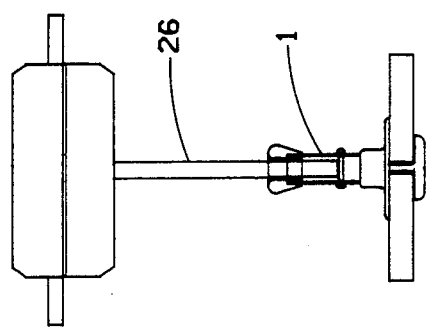
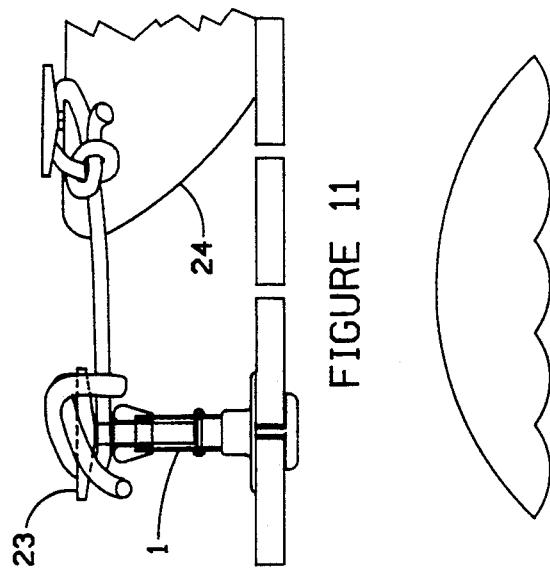
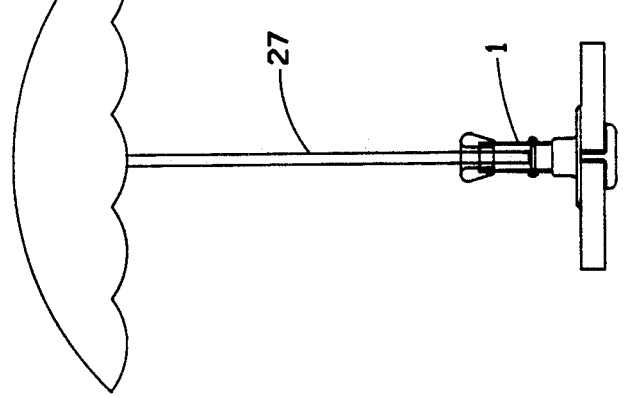

5,120,016

SUN DECK AND PIER ROD AND TOOL HOLDING DEVICE

There are various means of supporting fishing rods or other items on a dock or pier. There are rail rod holders that clamp onto a rail of a dock or boat, there are other devices that can be fastened to a boat or dock rail with screws or bolts, but there are some docks without rails and there are some docks and boat rails that rod holders cannot be fastened to. There are no dock rails that will support a chair and further allow the fisher person to face the fishing rod.

When a lawn chair is placed on a sun deck, dock or pier, it takes up a lot of space and in high winds it can be blown around or blown off of the sun deck, dock or pier unless it is fastened to the deck.

All of these designs are unsatisfactory for holding fishing rods, chairs, tools, or other items on a sun deck, pier, or a dock.

SUMMARY

It is the object of the present invention to make a satisfactory fishing rod holding device or chair holding device or tool holding device that will take up little space and yet be firmly fixed to a sun deck or a dock or pier.

It is still another object of the present invention to make a fishing rod holding device, a chair holding device, or a tool holding device that can be easily removed from a sun deck or a dock or pier without damaging the sun deck or dock or pier.

The features of the present invention can be best understood together with further objects and advantages by reference to the following descriptions taken in conjunction with accompanying drawings wherein like numerals indicate like parts.

BRIEF DESCRIPTIONS OF THE DRAWINGS

FIG. 1 is an elevation showing the dock and pier rod and tool holding device, supporting a fishing rod and a chair.

FIG. 2 is an elevation of the device being inserted into the planks .

FIG 3 is a plan view of FIG. 2.

FIG. 4 is a 90 degree elevation of FIG. 2.

FIG. 5 is a plan view of FIG. 4.

FIG. 6 is an elevation of the T flange being place on the threaded plug.

FIG. 9 is a section elevation taken through FIG. 7.

FIG. 10 is a section taken through FIG. 8.

FIG. 11 is an elevation view showing the device as a boat cleat.

FIG. 12 is an elevation view of the device holding an umbrella.

FIG. 13 is an elevation view of the device holding a barbecue grill.

FIG. 14 is an elevation view of the device holding a lamp or a tiki torch.

FIG. 15 is an elevation view of the device holding plant pots.

DETAILED DESCRIPTION OF THE PREFERRED EMBODIMENT

Figure 8:
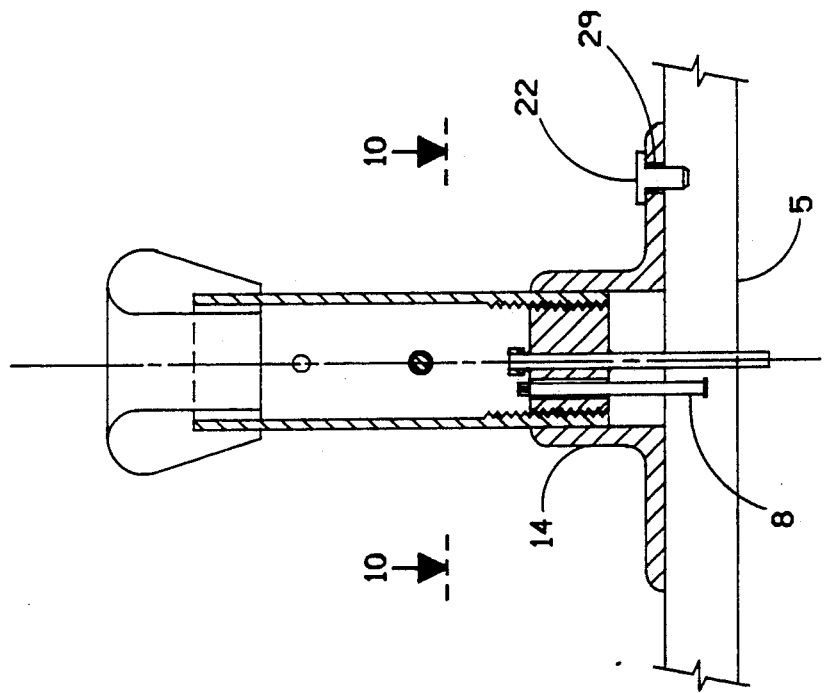
FIG. 8 is a section elevation taken through FIG. 7.

Referring to FIG. 1, there is shown an elevation view of two sun deck and pier rod and tool holding devices 1, holding a fishing rod 2 and a chair 3 on a pier 4 or a deck.

The sun deck and pier rod and tool holding device 1 is shown being held to the planks 5 of the pier or sun deck.

Referring to FIG. 2, there is shown an elevation of the T bar 6 being inserted into the space between the planks 5. The T bar 6 is shown with a cross bar 12 at the first end and a threaded plug 7 at the second end. On top of the threaded plug 7 is the plug turning bar 8 that will make it easier for a person to grip the T bar 6 and rotate the T bar 6 without having to grip the threaded plug 7, possibly cutting the fingers on the threads as a person attempts to turn the T bar 6.

Behind the plug turning bar 8 is the antirotation bar 9 which will be further explained in FIGS. 4, 5, and 6.

Referring to FIG. 3, there is shown a plan view of the threaded plug 7 on the planks 5.

The T bar 6 is pushed through the gap 10 between the planks 5 of the pier 4 or sun deck. The plug turning bar 8 is shown at the top of the threaded plug 7.

Referring to FIG. 4, there is shown the T bar 6 and the threaded plug 7 rotated 90 degrees in the planks 5.

The antirotation bar 9 has been allowed to drop into the gap 10 between the planks 5. The antirotation bar 9 is shown lowered into the gap 10. The antirotation bar 9 is shown with a stop bar 11 at the second end to prevent the antirotation bar 9 from falling out of the threaded plug 7.

Referring to FIG. 5 there is shown a plan view of FIG. 4.

The T bar 6 is shown rotated about 90 degrees from FIG 3 causing the cross bar 12 to cross the gap 10 and further locking the T bar 6 in place. The antirotation bar 9 is shown in the gap 10 to prevent the threaded plug 7 from further rotating.

Referring to FIG. 6, there is shown the T flange 14 being lowered onto the threaded plug 7. The T flange 14 is comprised of a flange 15 at the first end a tube 16 that is suitably fixed to the flange 15. The T flange 14 has threads 18 on the inside that correspond with the threaded plug threads 19. The T flange 14 is lowered onto the threaded plug 7 and screwed onto the threaded plug 7. As the T flange 14 is being screwed onto the threaded plug, the antirotation bar 9 prevents the threaded plug 7 from rotating. The tube 16 extends from the flange 15 at the first end of the T flange 14 to the second end of the tube 16 where it is fixed to a soft cap fitting 17. The soft cap fitting 17 has two purposes; one purpose is a safety cover for the second end of the tube 16 which will prevent an injury from a tube projecting from the planks 5; the second purpose of the soft cap fitting 17 is to act as a soft gripping device to hold items in the tube 16.

Figure 7:
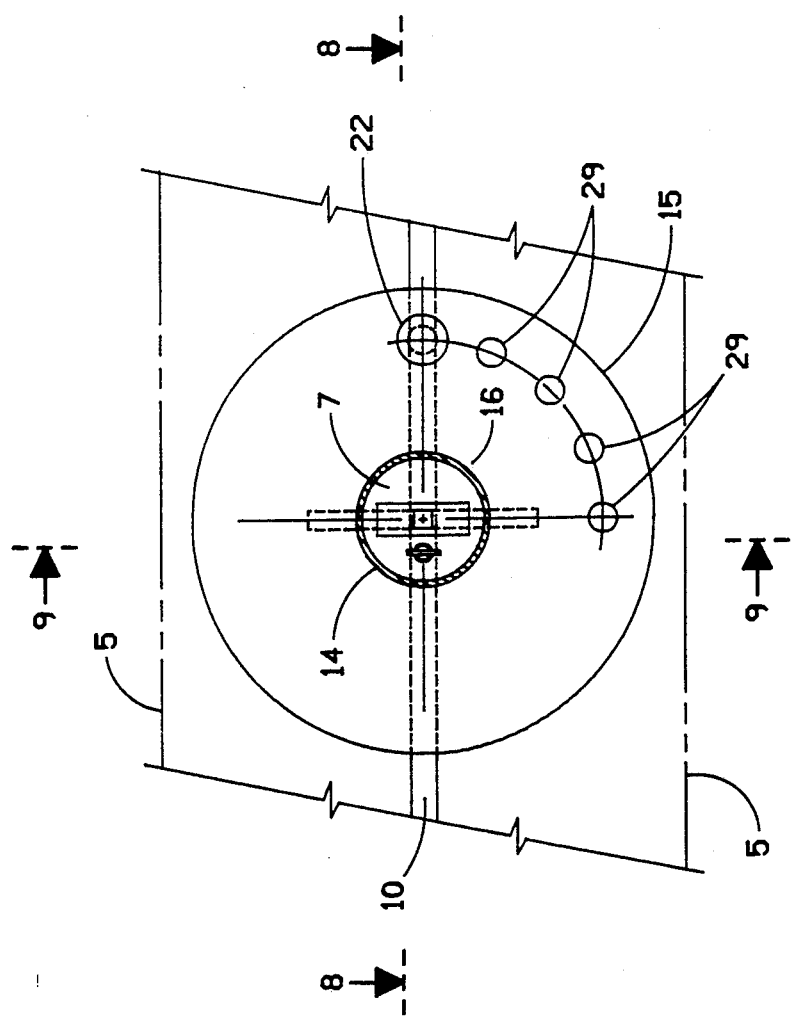
FIG. 7 is a section taken through FIG. 1.

Referring to FIG. 7, there is shown a section plan view of the flange 15 and the tube 16 screwed onto the threaded plug 7. The T flange 14 extends across the gap 10 between the planks 5. The T flange stop 22 is shown inserted into one of the flange stop holes 29 to prevent the flange 15 from rotating.

Referring to FIG. 8, there is shown a section elevation taken through FIG. 7.

The T flange 14 is shown screwed onto the threaded plug 7. The threaded plug 7 has been pulled up into the T flange 14. The antirotation bar 8 is shown in the gap of the planks 5. The T flange stop 22 is shown inserted into a flange stop hole 29 and the gap to prevent the T flange 14 from rotating.

Referring to FIG. 9, there is shown the T flange 14 on the top of the planks 5 and the cross bar 12 under the planks 5.

As the T flange 14 is screwed onto the threaded plug 7, the threaded plug 7 is unable to turn because of the antirotation bar. The threaded plug 7 will rise in the T flange 14 as the T flange 14 rotates about the threaded plug 7; as the threaded plug 7 rises, it will pull up on the T bar 6 until the cross bar 12 is tight against the bottom of the plank 5 and the T flange 14 is tight against the top of the plank 5. When the plank 5 is compressed between the T flange 14 and cross bar 12, the sun deck and pier rod and tool holding device 1 will be locked to the planks 5 and it is ready to be used to support a fishing rod, chair, a barbecue grill, a plant holder, or a boat cleat or other devices.

Also shown in FIG. 9 is a pin 20 that can be placed into the pin holes 21 The pin 20 can be placed in the upper pin holes 21 or the lower pin holes 21. The pin 20 is a means of changing the depth of the tube 16 if for example a short handled fishing rod is inserted into the tube 16. The pin 20 can also be inserted through the device to be held in the tube 16 and the tube 16 itself thus locking the device to be held to the tube 16.

Referring to FIG. 10, there is shown a section plan view of the tube 16 as taken through FIG. 8.

The tube 16 is shown with plug turning bar 8 fixed to the threaded plug 7. The antirotation bar 9 is also shown next to the plug turning bar 8.

Referring to FIG. 11, there is shown the sun deck and pier rod and tool holding device 1 being used as a boat cleat 23 to tie a boat 24 to.

Referring to FIG. 12, there is shown the device 1 being used to support an umbrella 25.

Referring to FIG. 13, there is shown the device 1 being used to support a barbecue grill 26.

Referring to FIG. 14, there is shown the device 1 being used to support a lamp 27.

Referring to FIG. 15, there is shown the device 1 being used to support a plant stand 28.

Although the system described in detail supra has been found to be most satisfactory and preferred many variations are possible. For example, the sun deck device may be used in pairs on a larger unit. It could be used to suspend a tray over a swimming pool or four devices could be used to support a table or chairs.

Although the invention has been described with reference to the preferred embodiment, it will be understood by those skilled in the art, that additions, modifications, substitutions, deletions, and other changes not specifically described, may be made in the embodiments herein, it should be understood that the details herein are to be interpreted as illustrative and are not in a limiting sense.

What is claimed as invention is:

1. A device that holds and supports tools, fishing rods, chairs, tables, barbecue grills, lamps or other devices on a sun deck, a dock, or a pier that is made of planks with a gap between said planks comprising:

a T bar, said T bar is formed in the shape of an inverted T, said T bar further having a first end and second end wherein said first end has a cross bar;

a threaded plug, said threaded plug further has a first end and a second and wherein said first end of said threaded plug is fixed to the second end of said T bar and said threaded plug further has threads said threads extend around said threaded plug;

a anti rotation bar within said threaded plug wherein said anti rotation bar may be raised or lowered within said threaded plug;

a T flange wherein said T flange has a first end and a second end and said T flange further has a tube that extends from said flange at said first end and said tube extends to said second end of said T flange, said T flange further is hollow with inside threads that are compatible with said threads of said threaded plug;

and wherein said cross bar of said T bar is inserted into said gap between said planks until said cross bar of said T bar is rotated about ninety degrees until said cross bar of said T bar crosses said gap between said planks, and said anti rotation bar is further lowered or inserted into said gap between said planks thus preventing said threaded plug from rotating and wherein said T flange lowered over said threaded plug and said threads on said T flange are connected to said threads on said threaded plug and said T flange is further rotated, further pulling up on said threaded plug and further pulling up on said cross bar of said T bar until said cross bar of said T bar is tight against the lower side of said planks of said sun deck or pier and said T flange is tighter against the upper side of said planks of said sun deck and pier and said device is locked to the said planks of said sun deck, dock, or pier and wherein said tools, fishing rods, chairs, or other items may be placed in said tube of said T flange.

2. The device of claim 1, wherein a soft cap fitting is fixed to said second end of said T flange, said soft cap to cover said second end of said tube to prevent injuries.

3. The device of claim 1, wherein said threaded plug further has a plug turning bar fixed to said second end of said threaded plug.

4. The anti rotation bar of claim 1, wherein said anti rotation bar is lowered into said gap between said planks when said T bar is rotated about ninety degrees.

5. The device of claim 1, wherein said T flange has flange stop holes formed in said T flange.

6. The T flange of claim 5, wherein a flange stop pin is inserted into said flange stop holes formed in said T flange and said gap to further prevent said T flange from rotating.

7. The tube of claim 1, wherein said tube further has holes formed into the sides of said tube to allow a pin to be inserted into said holes said pin to extend across said tube.

8. The soft cap of claim 1, wherein said soft cap has an annulus formed in center of said soft cap, said annulus to hold handles of said fishing rods or tools.

* * * * *